July 26, 1966   E. P. WORTHEN ET AL   3,262,497
HEADER-TUBE ASSEMBLY AND FITTING THEREFOR
Original Filed Aug. 22, 1960   2 Sheets-Sheet 1
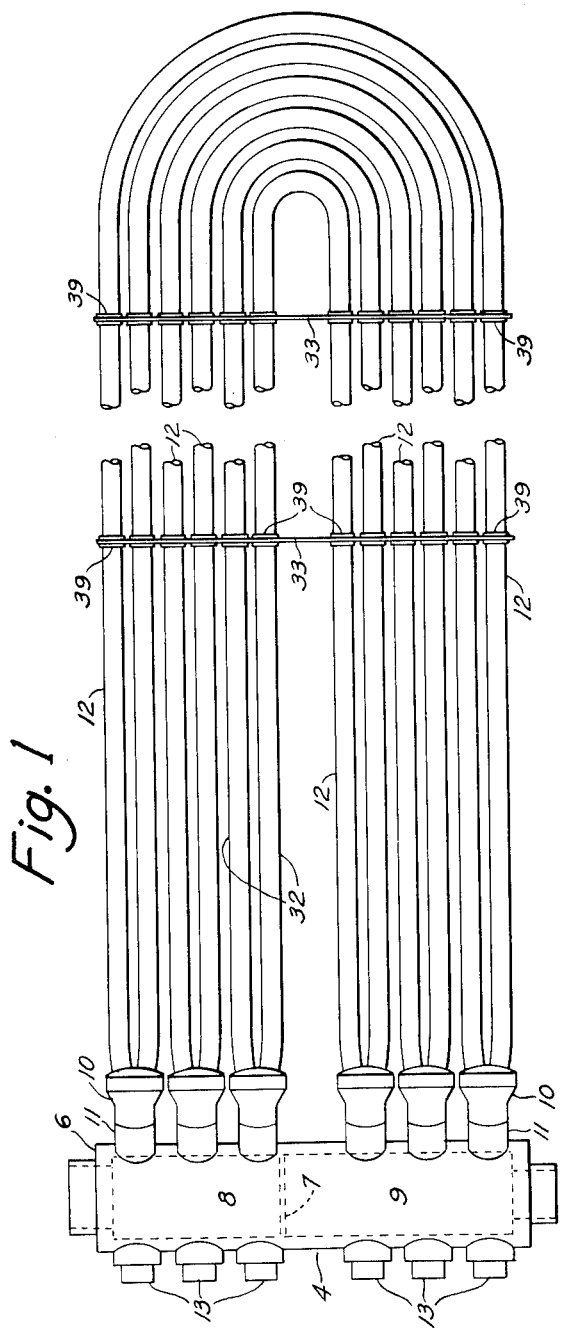
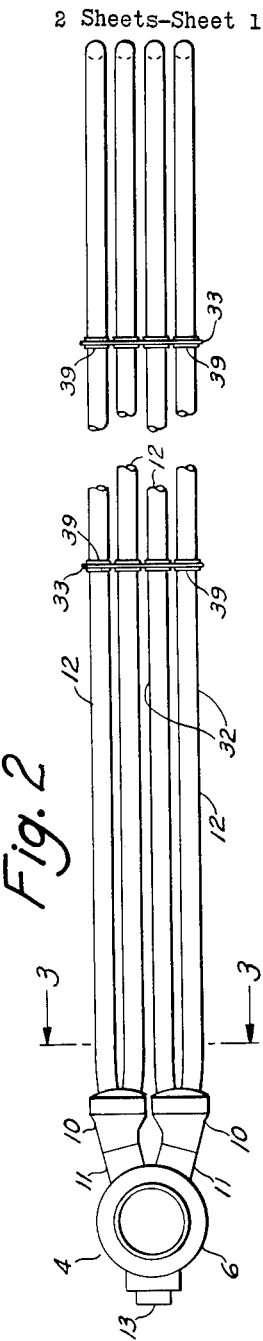
INVENTORS
Eugene Porter Worthen
John Henry Stelling
BY Natt M. Emery Jr.
ATTORNEY

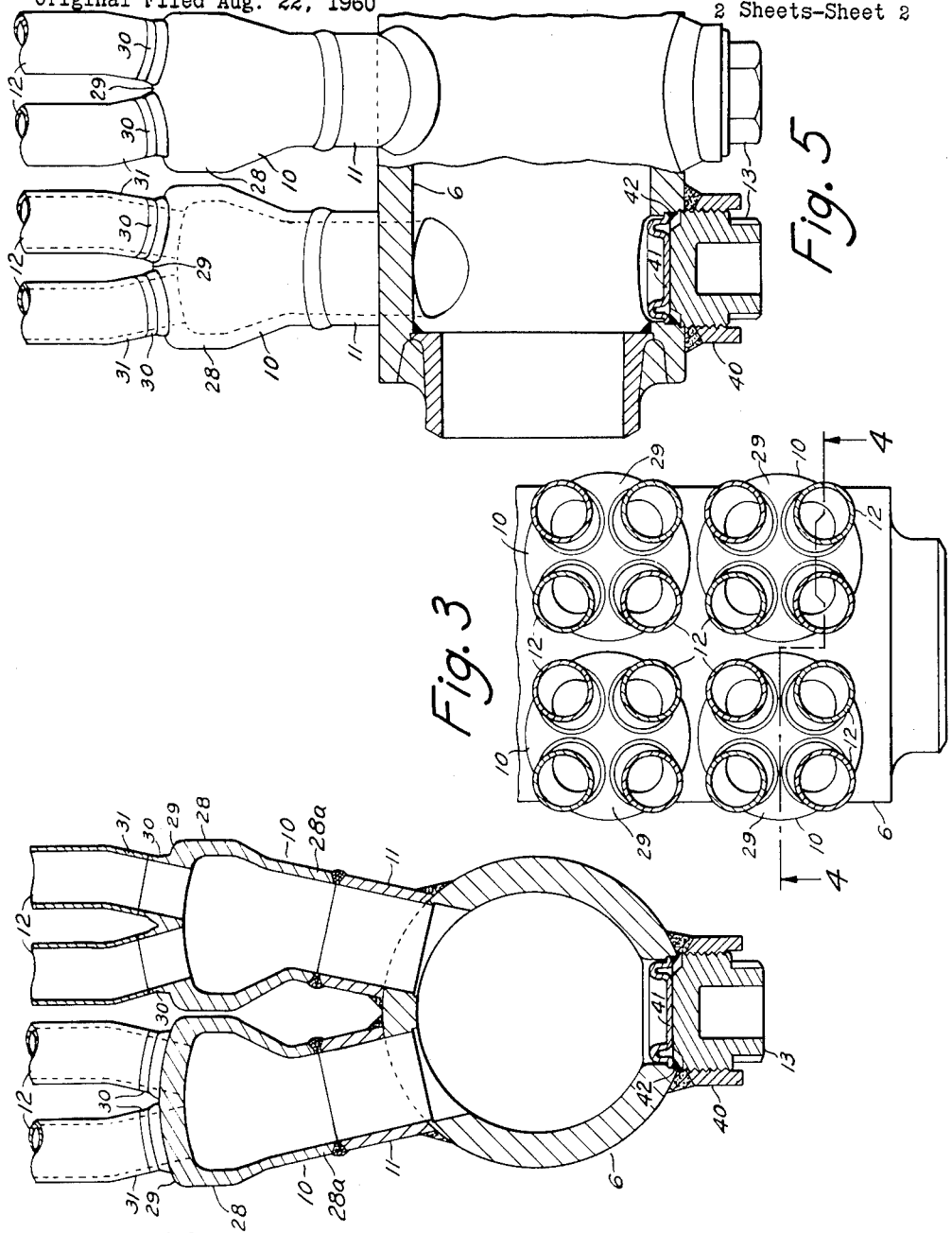

United States Patent Office 3,262,497
Patented July 26, 1966

3,262,497
HEADER-TUBE ASSEMBLY AND
FITTING THEREFOR
Eugene Porter Worthen, Braintree, and John Henry
Stelling, South Yarmouth, Mass., assignors, by mesne
assignments, to Bethlehem Steel Corporation, a corporation of Delaware
Original application Aug. 22, 1960, Ser. No. 51,043.
Divided and this application Mar. 8, 1965, Ser.
No. 437,944
2 Claims. (Cl. 165—176)

This application is a division of our copending application Serial No. 51,043 filed August 22, 1960, for "Tubesheetless Buttwelded U-Tube Type Combined Steam Generator and Non-Condensable Gas Extractor."

The present invention relates broadly to a fitting for connecting a tube to a header and to the assembly of a plurality of said fittings and tubes with said header. More specifically, the present invention relates to a fitting for connecting a plurality of tubular elements to a pipe header and to the assembly of a plurality of said fittings and tubes with said header.

In parent application Serial No. 51,043, above mentioned, a steam generator is disclosed employing primary saturated steam from a nuclear reactor of the boiling water type to convert a secondary fluid such as water into steam which latter may be used to operate a power plant.

As an example of the working conditions under which the above mentioned steam generator may operate, typically, primary saturated steam from a reactor at 1000 p.s.i.a. (approximately 545° F.) is introduced into the generator to raise secondary steam at 600 p.s.i.a. (approximately 486° F.), the primary steam condensate leaving at about 545° F. and the secondary feed water entering at about 486° F. These figures are given by way of illustration only.

Tremendous difficulties and high costs have been involved in the design and construction of conventional U-tube type steam generators used in conjunction with nuclear power plants. In addition to the high temperatures and pressures encountered, there is also the necessity of insuring that the primary steam, which may be contaminated by radioactive material, would not endanger personel in the event of leakage in the equipment. Also, special materials of construction are required with problems of fabrication and cladding naturally arising.

For the construction of steam generators of the type above mentioned along conventional lines, tube sheet thicknesses of the order of 12" are required. The tube sheets are difficult to fabricate, and are very heavy and hard to handle. The tube sheet head is large in diameter, with many large bolted handhole openings using seal welded gaskets for the cover plates making access to the tubes difficult. The head is subject to the full reactor pressure. Tube holes for tubes as small as ½" in diameter must be drilled through the full thickness of the tube sheet. The tube sheet and tube sheet head are made of steel and must be clad with welded layers of corrosion resistant steel amounting to a thickness of ⅜". This construction is required in order to avoid the tremendous expense of tube sheets and heads made entirely of corrosion resistant steel. The stainless steel tubes, which are expanded into the very thick tube sheet, are strength-welded at their ends to this corrosion resistant steel cladding on the tube sheet. This operation must be accomplished through the holes in the head. Cladding is impractical here because when two materials, having different coefficients of expansion (such as ordinary steel and corrosion resistant steel), are welded together, undesirable stresses cannot be avoided. Tube leakages in such conventional apparatus have occurred, and plugging of tube holes requires the opening of at least two large seal welded handholes (about 6" to 8" in diameter).

One of the objects of this invention is to eliminate the tube sheets conventionally used in ordinary steam generators.

Another of the objects of this invention is to overcome some of the tremendous difficulties and high costs encountered in the present design and construction of the conventional U-tube type steam generators used in conjunction with nuclear power plants.

A further and particular object of this invention is to provide novel four-element fittings connecting the steam generator tubes to simple inlet and outlet headers, in place of the large, heavy and complicated tube sheets and heads conventionally used.

Yet a further and particular object of this invention is to eliminate the requirement for cladding the internal parts of a tubesheetless U-tube type steam generator, by making such internal parts (which may come in contact with the primary steam) of standard shapes with small wall thicknesses so that the same can be made entirely of corrosion resistant steel at considerable economy.

Still another and particular object of this invention is to provide a special four-element fitting which permits the quick and easy plugging of a single U-tube, and which avoids the thermal stress problems caused in conventional apparatus in which thin tubes are welded with difficulty to very thick tube sheets.

Other and further objects of this invention will become apparent during the course of the following descriptions.

We have discovered that the foregoing objects can be attained by providing a multi-element fitting having a particular configuration with an enlarged head thereon.

Referring now to the drawings in which like numerals represent like parts in the several views:

FIGURE 1 represents a view in elevation of a typical header assembly showing the pipe header, several of the multi-element fittings comprising the present invention, the U-tubes and the handhole plugs.

FIGURE 2 represents a view in plan of the typical header assembly shown in FIGURE 1.

FIGURE 3 represents an enlarged section in elevation taken along the line 3—3 of FIGURE 2.

FIGURE 4 represents an enlarged section in plan taken along the line 4—4 of FIGURE 3.

FIGURE 5 represents a view in elevation of FIGURE 4, partially broken away at the centerline.

The four-element fitting 10 of the present invention is described herein in association with a header assembly 4, the latter comprising, in addition to a plurality of said fittings 10, a pipe header 6, preferably constructed from standard size pipe, a transversely disposed diaphragm 7 therein and defining inlet chamber 8 and outlet chamber 9, stubs 11 welded to said fittings 10 and to said header 6, U-tubes 12 welded to said fittings 10, and handhole plugs 13.

As described in the parent application Serial No. 51,043 above mentioned, fluid (such as primary saturated steam from a nuclear reactor of the boiling water type) enters the header assembly 4 through inlet chamber 8, passes through U-tubes 12 and leaves the header assembly 4 from outlet chamber 9. As also described in the said parent application, U-tubes 12 are spaced and supported by means of tube plates 33 and may, for example, extend through ferrules 39 in the said tube plates 33.

The four-element fittings 10 of the present invention and which connect pipe sections 11 on header 6 to U-tubes 12, replace the complicated conventional tube sheets presently used in the design of steam generator and heat exchangers for nuclear power plants. Each fitting 10, which may be forged or cast depending upon the properties of the material required, has an enlarged head 28 slightly offset from a base pipe section 28a (as shown in FIG. 4), the surface 29 of same preferably being curved as shown. Stubs 30 are welded to head 28, and if fitting 10 is forged, said stubs 30 can also be forged integral therewith, and are preferably normal to said curved surface 29 and evenly spaced about said head 28. Ends 31 of U-tubes 12 are bent so that they meet squarely the stubs 30 (i.e., the plane of contact is at right angles to the centerline of ends 31 and is the same as a right cross section of the ends 31, namely a circle) and are butt-welded thereto. The plane of contact being circular and at right angles also to the centerline of stubs 30, said stubs 30 may likewise be circular and thus by suitably orienting said stubs about the centerline of head 28, fittings 10 can be designed small enough to avoid interference therebetween when arranging the same to assimilate a tube sheet layout. It should also be noted that, in buttwelding a U-tube end 31 to a stub 30, an internal welding ring may be required. Such rings are well-known in the welding art and are not shown here. Because the plane of contact at the weld is circular, such welding ring being circular can easily be drilled out after the weld has been made. The drilling should be done before the multi-element fitting 10 has been attached to pipe sections 11 on header 6.

It will be apparent from the foregoing that four-element fittings 10 permit a tube bundle arrangement of practically any pitch (center-to-center spacing of tubes 12).

A group of four U-tubes 12, correctly spaced, and two four-element fittings 10 form a four-element U-tube assembly 32. In the particular embodiment shown, there are in the header assembly 4 six four-element U-tube assemblies 32.

When a U-tube 12 develops a defect, the openings in four-element fittings 10 corresponding to the defective U-tube 12 can be plugged, permitting continued operation of the steam generator until such time as it is convenient to replace the defective U-tube 12. To secure access through header 6 to the proper hole of the particular four-element fitting 10 for quick installation of a plug (not shown), handhole plug 13 is unscrewed from internally threaded collar 40, seal weld 42 is cut and diaphragm 41 is removed.

It will be seen that certain advantages over conventional construction are attained. Thus:

(1) Small and simple inlet and outlet headers made from standard pipes (6" in the preferred embodiment, although this size may vary), together with the four-element fittings, replace the large, heavy and complicated tube sheets and heads.

(2) The U-tube ends are simply butt-welded to the stubs of the four-element fittings, thus eliminating a complicated setup for welding small thin tubes to heavy tube sheets. In certain cases, brazing of the U-tube ends to the stubs may be preferable.

(3) The four-element fittings can be developed for mass production or can be cast.

(4) All pressure parts for the primary system are small (in the preferred embodiment, the largest diameter is about 8"), low in weight, simple to handle and easy to fabricate.

(5) Generally, it is not required to clad any of the internal parts which come into contact with the primary heating medium, the maximum thickness of any of these walls in the preferred embodiment being less than ¾". This permits the use of parts made entirely of Monel or stainless steel, for example, at reasonable cost. (In the preferred embodiment, only those steel elements used where the primary system leads penetrate the steel drum are clad on the inside.)

(6) Commercial standard dimensions are used for most parts of the primary system.

We claim:
1. A header assembly comprising:
 (a) pipe header means having:
  an inlet chamber, and
  an outlet chamber,
 (b) a pair of multi-element fittings, each of said multi-element fittings comprising:
  a pipe section secured to said pipe header means,
  an enlarged convex head portion on said pipe section, and
  a plurality of stubs secured normally to the surface of said enlarged convex head portion,
  one of said multi-element fittings being in fluid communicating relation with said inlet chamber and the other of said multi-element fittings being in fluid communicating relation with said outlet chamber,
 (c) a plurality of U-tubes having:
  leg portions, and
  end portions,
  the leg portions of all U-tubes being parallel to each other, the end portions of said U-tubes being bent at an angle to their respective legs to meet squarely said stubs and buttwelded thereto.
2. A header assembly comprising:
 (a) a pipe header having:
  a first end, and
  a second end,
 (b) a diaphragm transversely mounted in said pipe header between said first and second ends dividing said pipe header into an inlet chamber and an outlet chamber,
 (c) first conduit means communicating with said inlet chamber through said first end of said pipe header for introducing fluid into said inlet chamber,
 (d) second conduit means communicating with said outlet chamber through said second end of said pipe header for removing fluid from said outlet chamber,
 (e) multi-element fittings on said inlet chamber and said outlet chamber, each of said multi-element fittings comprising:
  a pipe section secured to said pipe header,
  an enlarged convex head portion on said pipe sections, and
  a plurality of stubs secured normally to the surface of said enlarged convex head portion,
 (f) a plurality of U-tubes communicating between said inlet chamber and said outlet chamber through said multi-element fittings, each of said U-tubes having:
  leg portions, and
  end portions,
  the leg portions of all U-tubes being parallel to each other,
 (g) there being one stub for each U-tube end, each U-tube end being bent at an angle to its leg to meet its respective stub squarely and butt welded thereto, and
 (h) removable sealing means in openings in said pipe header opposite each of said multi-element fittings.

References Cited by the Examiner
UNITED STATES PATENTS

| | | | |
|---|---|---|---|
| 1,850,937 | 3/1932 | Messinger | 285—150 |
| 2,237,617 | 4/1941 | Trede | 165—176 |
| 2,256,882 | 9/1941 | Sebold | 165—176 |
| 2,473,561 | 6/1949 | Balmer | 165—158 |
| 2,505,303 | 4/1950 | Randa | 285—150 |
| 2,762,635 | 9/1956 | Lorber | 165—176 |
| 2,763,923 | 9/1956 | Webb | 165—178 |

ROBERT A. O'LEARY, *Primary Examiner.*

CHARLES SUKALO, *Examiner.*